(No Model.) C. M. CARNAHAN. 2 Sheets—Sheet 1.
APPARATUS FOR FORMING TAPERING PIPE.
No. 455,274. Patented June 30, 1891.
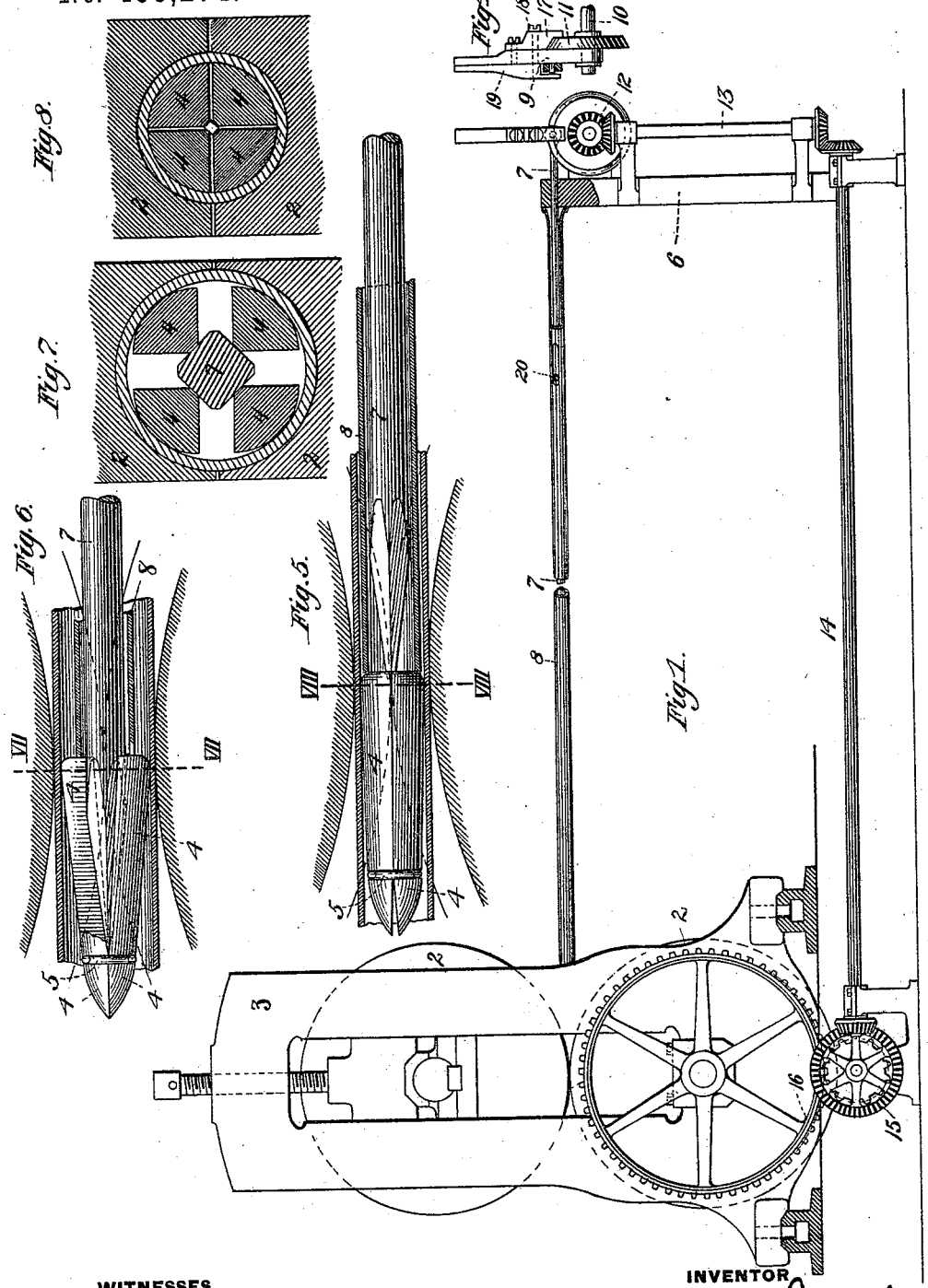
WITNESSES
INVENTOR (No Model.) 2 Sheets—Sheet 2.
C. M. CARNAHAN.
APPARATUS FOR FORMING TAPERING PIPE.
No. 455,274. Patented June 30, 1891.
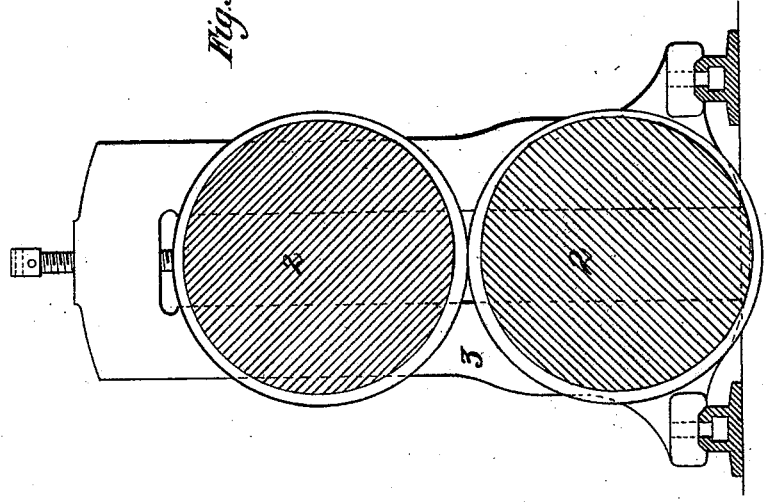
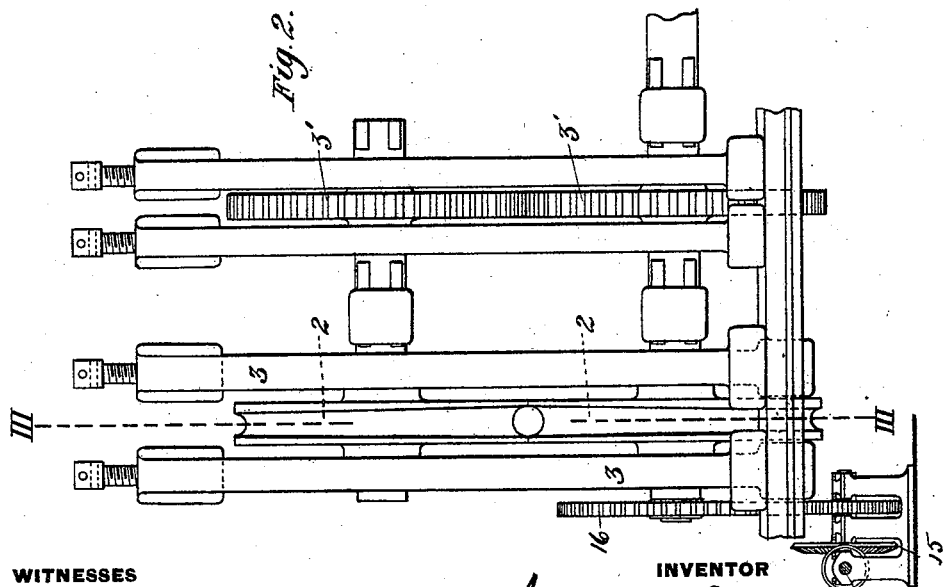

UNITED STATES PATENT OFFICE.

CYRUS M. CARNAHAN, OF CORAOPOLIS, ASSIGNOR TO ALPHRETTA CARNAHAN, OF SAME PLACE, AND JOSEPH C. YOUNG, OF ROBINSON TOWNSHIP, PENNSYLVANIA.

APPARATUS FOR FORMING TAPERING PIPE.

SPECIFICATION forming part of Letters Patent No. 455,274, dated June 30, 1891.

Application filed August 11, 1890. Serial No. 361,709. (No model.)

*To all whom it may concern:*

Be it known that I, CYRUS M. CARNAHAN, of Coraopolis, in the county of Allegheny and State of Pennsylvania, have invented a new and useful Improvement in Apparatus for Forming Tapering Pipe, of which the following is a full, clear, and exact description, reference being had to the accompanying drawings, forming part of this specification, in which—

Figure 1 is a side elevation, partly in section, of my improved apparatus. Fig. 2 is a front elevation of the rolls. Fig. 3 is a vertical section on the line III III of Fig. 2. Fig. 4 is a detail view. Fig. 5 is a side elevation of the mandrel, showing it inside a pipe between the rolls, the sections of the mandrel being contracted. Fig. 6 is a similar view showing the mandrel expanded. Fig. 7 is a cross-section on the line VII VII of Fig. 6. Fig. 8 is a cross-section on the line VIII VIII of Fig. 5.

Like symbols of reference indicate like parts in each.

In the drawings, 2 2 are the rolls which I use in making tapering pipe or hollow bars. They are set in suitable housings 3 and driven by suitable pinions, and are formed with peripheral grooves, which afford a pass of the same shape as the exterior outline of the pipe or bar to be formed therein, and which taper in depth and width conformably to the taper desired to be formed on such pipe or bar. (See Fig. 3.)

The mandrel which I use in the interior of the pipe is shown in the figures on Sheet 1 of the drawings. It consists of a head composed of a number of sections 4 4, preferably four in number, which are tied together near their front end by an encircling band or wire 5, the front end of the sections being preferably tapered externally. They are also beveled on their inner sides so that their rear portions may be spread, as shown in Fig. 6, in order to vary the effective cross-section of the mandrel.

7 is a bar having its end of wedge shape, adapted to enter the space between the rear portions of the sections 4 and to spread them.

8 is a tube through which the bar 7 is inserted. This tube extends back to a standard 6, and the bar 7 passes through the standard, and at its rear end is pivotally connected to an arm 9, which is journaled on a shaft 10, as shown in Fig. 4. On this shaft is a wheel 11, having a plain beveled periphery, and the shaft is driven through a gearing 12 and a counter-shaft 13 by a shaft 14, the rotation of which is produced by suitable gearing 15, connected with a pinion 16 on the shaft of one of the rolls, so that the rotation of the wheel 11 shall be exactly proportionate to the rotation of the rolls. The arm 9 is provided with a clamping device by which it may be attached to the wheel 11, and which consists of an arm 17, adapted to fit against the wheel 11 and provided with a screw-bolt 18 which passes through the arm 9 and has a handle 19, by which the bolt may be turned to draw the arm tightly against the wheel. At the beginning of the pipe-welding operation the arm 9, with the rod 7, is advanced and is clamped to the wheel 11, and then as the wheel revolves it will retract the rod to contract the mandrel-sections. To restrain the motion of the rod 7 within proper limits, I provide it with a pin 20, which fits in a longitudinal slot in the tube 8. The sections of the mandrel are expanded by longitudinal motion of the bar 7, the end of which passes between the opposite sections, as shown in the drawings.

The operation is as follows: The skelp or metal plate to be formed into the tapering hollow bar or pipe is made in tapering form, and having been bent around into the form desired is heated to a welding heat. The mandrel, with its sections projected to their full extent, is situate between the rolls in the grooved pass, and the bent skelp is fed, larger end foremost, into the pass of the rolls outside the mandrel, as shown in Fig. 6, the seam of the skelp being adjacent to the middle portion of one of the sections 4. The rotation of the rolls draws the skelp forward over the tube 8. Said tube prevents the mandrel from moving with the skelp and the pressure of the rolls on the lapping parts of the seam welds them securely together. As the pipe advances, the gearing 16, 15, 14, 13, and 12 rotates the wheel 11 proportionately to the rotation of the rolls, and thus retracts the wedge-rod 7 correspondingly, so that as the operative parts of the grooves of the rolls diminish in cross-sectional dimensions, the sections of the mandrel are correspondingly contracted, and that at every part of the progress of the pipe as it tapers in dimension the mandrel affords to the seam a substantial internal support and resistance point or anvil. The rolling of the pipe and welding of the seam are continued until the pipe has passed entirely through the rolls onto the tube 8, from which it may be removed by removing the rod 7 from its support in the standard 6 and drawing it back with the tube 8 from within the welded pipe. The length of pipe to be rolled should not be greater than the circumference of one of the rolls 2, one revolution of which welds and shapes the pipe. The apparatus shown in the drawings is adapted to form pipe of circular section; but various other cross-sectional shapes may be welded thereby by proper variation in shape of the mandrel and of the grooves in the rolls.

The advantages of my invention will be appreciated by those skilled in the art. The uses to which the apparatus are applicable are manifold. It may be employed in tapering pipe for vehicle poles and shafts, tongues, axles, singletrees, telegraph and electric poles, and for other purposes, and in use it will be found to be easy to operate, effective and economical in its action, and not liable to get out of order.

I claim—

1. An improvement in the art of making tapering pipe, which consists in subjecting the skelp to external compression and moving it over a contained contractible mandrel or support, and gradually contracting the mandrel during the compressing operation, substantially as and for the purposes described.

2. In apparatus for forming tapering-pipe, the combination of the rolls, a mandrel provided with contractible sections, a wedge for expanding the same, and gearing connecting the rolls with the wedge to operate the same in a degree proportionate to the operation of the rolls, substantially as and for the purposes described.

3. In apparatus for forming tapering pipe, the combination, with the rolls, of a mandrel provided with projectible sections, a wedge-rod for projecting the same, mechanism for moving the rod longitudinally, and gearing connected with the rolls and with said mechanism, substantially as and for the purposes described.

4. In apparatus for forming tapering pipe, a mandrel composed of sections 4, pivotally connected together near one end, and a wedge adapted to enter between the sections to expand them, substantially as and for the purposes described.

In testimony whereof I have hereunto set my hand this 6th day of August, A. D. 1890.

CYRUS M. CARNAHAN.

Witnesses:
W. B. CORWIN,
H. M. CORWIN.